United States Patent
Scheetz et al.

(10) Patent No.: US 7,051,210 B2
(45) Date of Patent: May 23, 2006

(54) PERSISTANCE AND RECOVERY OF SECURITY KEYS

(75) Inventors: Michael Scheetz, Fort Collins, CO (US); Humberto A Sanchez, II, Ft Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 847 days.

(21) Appl. No.: 09/813,564

(22) Filed: Mar. 20, 2001

(65) Prior Publication Data

US 2002/0138739 A1 Sep. 26, 2002

(51) Int. Cl.
*H04K 1/00* (2006.01)
*H04L 9/00* (2006.01)

(52) U.S. Cl. ............... 713/185; 713/153; 713/156; 713/168; 380/30

(58) Field of Classification Search ........ 713/200–202, 713/168, 156, 185, 153, 30
See application file for complete search history.

(56) References Cited

U.S. PATENT DOCUMENTS 5,923,756 A * 7/1999 Shambroom .............. 713/156
6,615,350 B1 * 9/2003 Schell et al. .............. 713/168

* cited by examiner

*Primary Examiner*—Matthew Smithers
*Assistant Examiner*—Courtney Fields

(57) ABSTRACT

A method and system for persisting and recovering security keys in order to authorize access to a network system is disclosed. Certain security keys are read from a file with root as the effective user id in order to enable the reading of the keys. The certain security keys are placed into a local cache by the read process. If there are no errors in the read process, the certain security keys will preferably include a private key. If the private key is not in the cache (e.g., because there was an error in the read process) the authorization fails.

23 Claims, 5 Drawing Sheets

PERSISTANCE AND RECOVERY OF SECURITY KEYS

FIELD OF THE INVENTION

The invention generally relates to network system security, and particularly relates to security methods and systems for restricting access to network data, e.g. executables, using authentication of system identity.

BACKGROUND OF THE INVENTION

The most common approach of identifying user identity, i.e., system identity, is the use of passwords. If a user-supplied password matches a password stored in a system, then that user is considered as authorized to use some set of system resources and data. The main problem with using passwords is the difficulty in keeping the password secret.

Public key encryption of variable data is a more secure method of maintaining system security. A form of public key encryption known as digital signature is available in the Java® programming language. A digital signature is created using a private key to encrypt a message. The message originator then sends the digital signature and the clear text message. The message receiver then uses the originator's public key, received in an earlier exchange, to prove that the message came from the same source as the public key.

The use of digital signature methods requires persistence of key pairs by the key owners, as well as an exchange of public keys with processes that will be performing authentication with the key owner. By taking advantage of built-in system file-access controls, the persisted keys can be protected against unauthorized use, i.e., the key files can only be read or written by processes owned by the key owner. Providing access to authorization keys to non-owner users while maintaining security is problematic, e.g., a private key is owned by root and is not readable or writeable by any other user, but a process that is owned by user 'sydney', where 'sydney' has passed some authorization criteria, must be allowed to read the private key in order to perform a task. The root user is a user that has permission to read, write and execute any file (e.g., a system administrator).

SUMMARY OF THE INVENTION

The present invention comprises a method and system for persisting and recovering security keys. Embodiments of the present invention act as a gatekeeper, restricting access to a network system. Likewise, embodiments of the present invention provide message security between remote processes. Also, embodiments of the present invention support root-only creation of and storage of the private keys. Moreover, embodiments of the present invention provide access to the private keys while maintaining their security, as well as the security of other files and resources on the system.

An embodiment of the method and system of the present invention comprises a root user creating a security key pair (e.g., private and public keys). Once the security keys have been written and stored, a daemon or a command line interface ("CLI") requiring authorization may be run. The daemon or CLI initializes a class that is designed to provide the authentication methods. The class may be, for example, a Java class running in a Java Virtual Machine ("JVM"). Executing with root as the effective user id ("UID"), the daemon or CLI issue a command to the authentication class to set certain security keys, which causes the authentication class to run a read method that retrieves the certain security keys from the key file and stores the retrieved keys in a cache in the authentication class. By executing with root as the effective UID, the security keys may be accessed by a non-root user CLI or a daemon even though a root user created the security keys.

Switching to execute using the real UID (i.e., the non-root users actual UID), the daemon or CLI invoke a method of the authentication class to get the security keys from the cache. By switching to execute using the real UID, the security of other data files and system resources is maintained. If a get method fails to get the security keys from the cache, the process and the authentication fails. The daemon or CLI is refused entry into the network system (e.g., the present invention acts as a gatekeeper that does not allow the daemon or CLI to enter without the proper keys).

If the get method succeeds, the daemon or CLI complete the authorization process by sending a message signed with the private key to a receiving process. The receiving process uses the public key and an unencrypted message to verify that the encrypted message and the public key came from the same source.

A method for persisting and recovering security keys in order to authorize a daemon or a CLI according to an embodiment of the present invention comprises reading certain security keys into a cache with root as an effective user id, wherein root as the effective user id enables the reading of files including the one or more security keys; attempting to retrieve a private key from the cache using a real user id, wherein the cached certain security keys may include the private key and the private key may be used to digitally sign a message; and determining if the private key was retrieved from the cache, wherein a failure to retrieve the private key from the cache indicates that authorization failed.

Likewise, a computer readable medium containing instructions for controlling a computer system to persist and recover security keys in order to authorize a daemon or a CLI according to the present invention, by reading certain security keys into a cache with root as an effective user id, wherein root as the effective user id enables the reading of files including the one or more security keys; attempting to retrieve a private key from the cache using a real user id, wherein the cached certain security keys may include the private key and the private key may be used to digitally sign a message; and determining if the private key was retrieved from the cache, wherein a failure to retrieve the private key from the cache indicates that authorization failed.

DETAILED DESCRIPTION OF THE INVENTION

Figure 1:
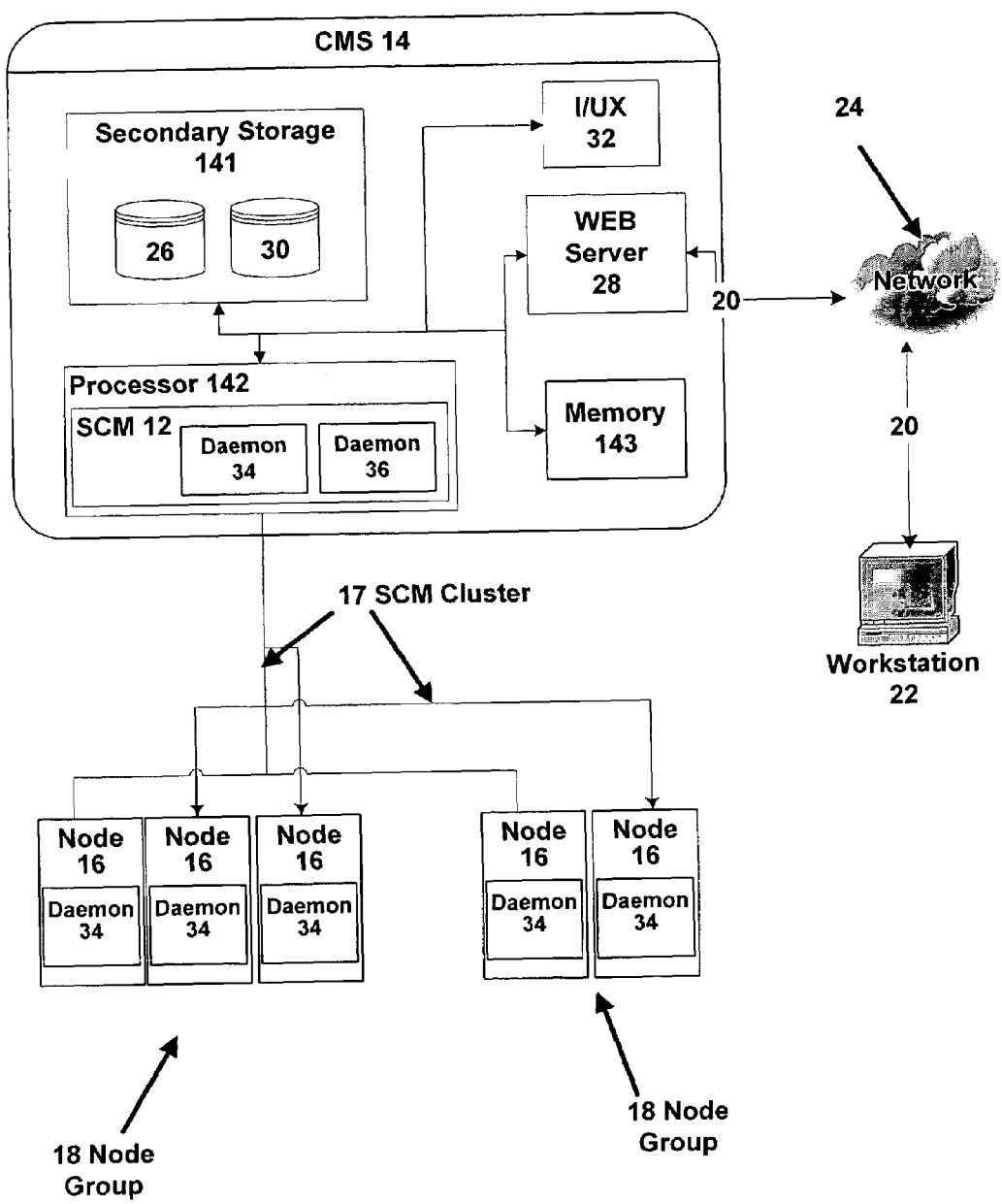
FIG. 1 is a block diagram of a network system in which an embodiment of the present invention is used.

The present invention may be used with network computer systems in which it is necessary to secure the system and in which only a restricted class of users (e.g., root users)

have read and write access to private keys. FIG. 1 illustrates such a network computer system with which the present invention may be used. The network computer system 10 comprises a ServiceControl Manager ("SCM") 12 running on a Central Management Server ("CMS") 14 and one or more nodes 16 managed by the SCM 12 on the CMS 14. Together the one or more nodes 16 managed by the SCM 12 make up a SCM cluster 17. A group of nodes 16 may be organized as a node group 18.

The CMS 14 preferably is an HP-UX 11.x server running the SCM 12 software. The CMS 14 includes a memory 143, a secondary storage device 141, a processor 142, an input device (not shown), a display device (not shown), and an output device (not shown). The memory 143, a computer readable medium, may include RAM or similar types of memory, and it may store one or more applications for execution by the processor 142, including the SCM 12 software. The secondary storage device 141, a computer readable medium, may include a hard disk drive, floppy disk drive, CD-ROM drive, or other types of non-volatile data storage. The processor executes the SCM 12 software and other application(s), which are stored in memory or secondary storage, or received from the Internet or other network 24, in order to provide the functions and perform the methods described in this specification, and the processing may be implemented in software, such as software modules, for execution by the CMS 14 and nodes 16. The SCM 12 is preferably programmed in Java® and operates in a Java environment. See *ServiceControl Manager Technical Reference, HP® part number: B*8339-90019, available from Hewlett-Packard Company, Palo Alto, Calif., and which is hereby incorporated by reference, for a more detailed description of the SCM 12. The SCM *Technical Reference* is also accessible at http://www.software.hp.com/products/sc-mgr.

Although the CMS 14 is depicted with various components, one skilled in the art will appreciated that this server can contain additional or different components. In addition, although aspects of an implementation consistent with the present invention are described as being stored in memory, one skilled in the art will appreciated that these aspects can also be stored on or read from other types of computer program products or computer-readable media, such as secondary storage devices, including hard disks, floppy disks, or CD-ROM; a carrier wave from the Internet or other network; or other forms of RAM or ROM. The computer-readable media may include instructions for controlling the CMS 14 (and/or the nodes 16) to perform a particular method, such as those described herein.

Generally, the SCM 12 supports managing a single SCM cluster 17 from a single CMS 14. All tasks performed on the SCM cluster 17 are initiated on the CMS 14 either directly or remotely, for example, by reaching the CMS 14 via a web connection 20. Therefore, the workstation 22 at which a user sits only needs a web connection 20 over a network 24 to the CMS 14 (or a managed node 16) in order to perform tasks on the SCM cluster 17. In addition to the SCM 12 software and the HP-UX server described above, the CMS 14 preferably also comprises a data repository 26 for the SCM cluster 17, a web server 28 that allows web access to the SCM 12 and a depot 30 comprising products used in the configuring of nodes, and a I/UX server 32.

The nodes 16 are preferably HP-UX servers or other servers and they may be referred to as "managed nodes" or simply as "nodes". The concept of a node 16 is that it represents a single instance of HP-UX running on some hardware. The node 16 may comprise a memory, a secondary storage device, a processor, an input device, a display device, and an output device. The SCM 12 is designed to manage single node HP-UX systems such as the N Class as well as the separate protection domains in a SuperDome™.

The CMS 14 itself is preferably also a managed node 16. This is so that multi-system aware ("MSA") tools can be invoked on the CMS 14. All other nodes 16 have to be explicitly added to a SCM cluster 17. Generally, user access to SCM 12 files is delineated to root users, who have permission to read, write, and execute files and non-root users, who have limited access to files (e.g., only execute).

The nodes 16 run a managed node agent (an "agent daemon") 34 that performs the management tasks sent to the nodes 16 from the CMS 14. The system 10 may include other daemons. For example, the CMS 14 may also comprise a plurality of CMS daemons 36. The agent daemons 34 preferably only communicate with the CMS daemons 36, while the CMS daemons 36 may communicate amongst themselves and with the agent daemons 34.

In order to participate in the SCM 12, the agent daemons 34 on the nodes 16 must be authenticated. As such, the agent daemons 34 and certain of the CMS daemons 36 execute the authentication process described below. Likewise, command line interfaces ("CLIs") by non-root users at a CMS 14 must be authenticated to participate in the SCM 12. This authentication preferably must be accomplished while maintaining root-only read access to private keys in order to secure the system 10.

Figure 2:
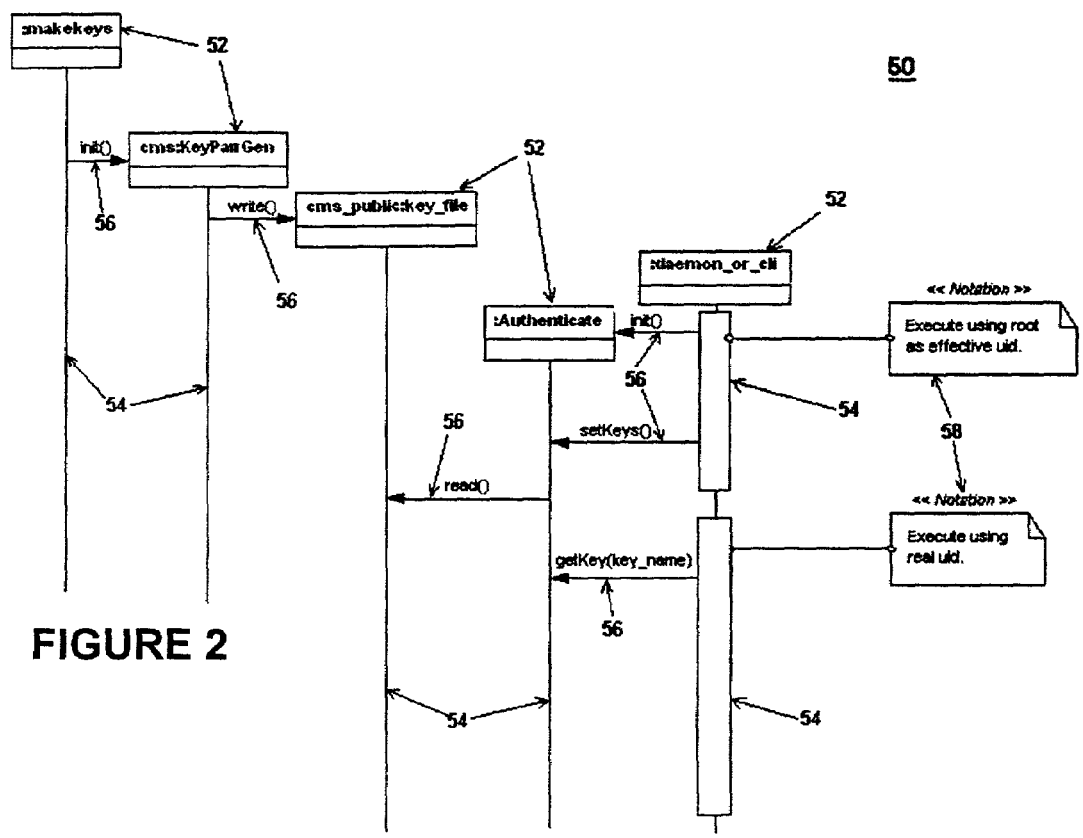
FIG. 2 is a sequence diagram illustrating a sequence of tasks performed by an embodiment of the present invention.

The system and method of the present invention accomplish authentication while maintaining root-only read access to the private keys. Through root permission and encryption, the present invention enables non-root users to access the system 10. FIG. 2 is a sequence diagram 50 that illustrates a sequence of tasks performed according to an embodiment of the present invention. The sequence diagram 50 illustrates boxes representing classes 52 with vertical time-lines 54 running from the classes 52 and horizontal command/method lines 56 running from the appropriate initiating class time-line 54 to the appropriate target class time-line 54. Commands are issued from CLIs or agent daemons 34, while methods are issued from classes. The vertical position of the classes 52 and command/method lines 56 refers to their sequential order of initialization and execution. Within each box representing a class 52 is a colon followed by (i.e., to the right of the colon) the class name. Any text preceding the colon (i.e., to the left of the colon) is an object name (an object is a specific instantiation of a class). Classes that do not name a specific object represent a generic or nonspecific instantiation of the class or, as in the case of Authenticate, a static class (a class that is not allowed to be instantiated). In an embodiment of the invention, the objects and classes are Java objects and classes running in a JVM. An object is preferably resident in a memory (e.g., the memory of the CMS 14) while running. The notation boxes 58 comprise comments about the class 52 to which they point.

Starting from the left of the sequence diagram 50 in FIG. 2, the makekeys object is a CLI that is entered by a root user in order to generate security keys for a managed node 16 or for the CMS 14. The security keys include a private key and a public key. The first task of the makekeys CLI in the sequence diagram 50 is to initialize a KeyPairGen object. A KeyPairGen object comprises a method for writing (the "write" method) the requested security key(s). The write method executes shortly after the KeyPairGen object is initialized.

In the sequence diagram 50 shown, the object name for the KeyPairGen class is "cms". The cms object indicates that the KeyPairGen class is being requested to generate a security key pair, i.e., private key and public key, for the CMS 14. An object such as "node" would indicate the KeyPairGen class is being requested to generate a security key pair for a managed node 16. The write method will persist (i.e., write) the security key pair to the key_file that is preferably stored as a file of the CMS 14. The security key pair for a managed node 16 may be stored locally at the managed node. Persisting a security key preferably comprises serializing the key object and storing the serialized key object as a file. In the sequence diagram 50 shown, the object of the key_file class is "cms_public_key", which indicates that the public key of the CMS 14 is being written to the key_file. Not shown is a similar object for the private key of the CMS 14.

Figure 3:
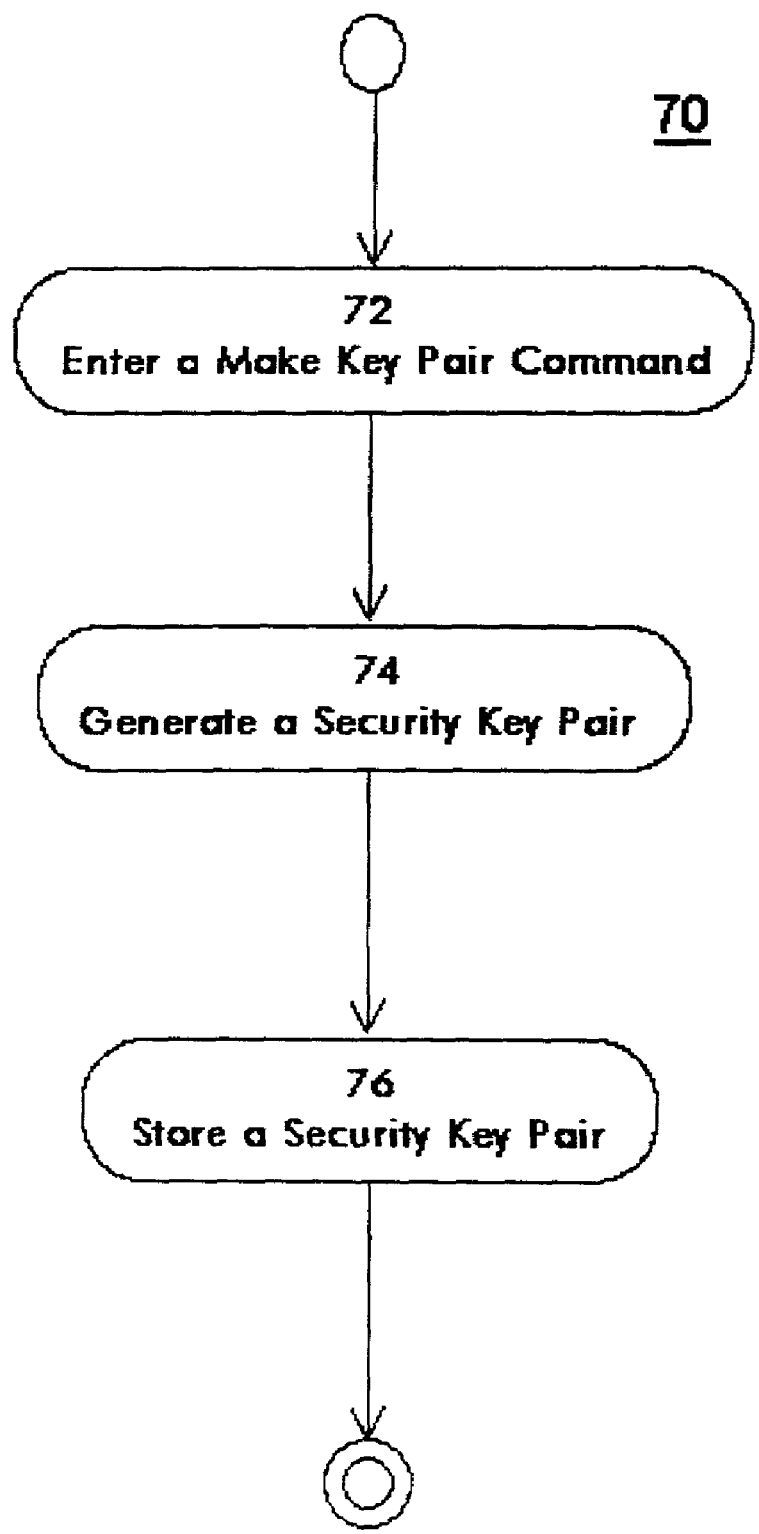
FIG. 3 is a flowchart illustrating a method of persisting security keys according to an embodiment of the present invention.

FIG. 3 illustrates a method for generating and persisting security keys 70 according to the process shown in the sequence diagram 50 of FIG. 2. As shown, the method 70 comprises entering a make key pair command 72, generating a security key pair 74 and storing the security key pair 76. The method 70 and the method steps 72–76 may be executed as described above with respect to the sequence diagram 50 or differently depending on the programming environment used. Entering a make key command 72 may comprise a root user entering a CLI command to make keys. The generating a security key pair 74 may comprise executing a method that generates a node 16 or CMS 14 public key and private key. Likewise, storing the security key pair 76 may comprise executing a method that serializes the public key and private key and saves the serialized key as a key file.

Referring again to FIG. 2, and starting from the right side of the sequence diagram 50, a daemon_or_cli (representing a daemon or cli object) indicates an agent daemon 34 or a non-root user (that has entered a CLI) is attempting to participate in the SCM 12. Accordingly, the right side of the sequence diagram 50 illustrates the recovery of security keys necessary to authenticate a daemon or a CLI. As commented by the first notation box 58, the daemon or cli object execute this init( ) command, and the other commands issuing from the first rectangular portion of the class time-line using root as the effective UID. Executing these commands with root as the effective UID enables the recovery (i.e., reading) of the security keys from the key_file, as is discussed below.

An authentication class (e.g., a Authenticate class) is initialized by the daemon or CLI. There is preferably only one Authenticate class for each daemon and CLI process. In other words, the Authenticate class is a static class.

After the Authenticate class has been initialized, the daemon or cli object issues a setKeys( ) method. The setKeys( ) method instructs the Authenticate class to execute a read( ) method that reads the necessary security keys from the key_file and caches the security keys, preferably by placing them in a private variable within the Authenticate class. The cache of the necessary security keys is therefore maintained within a process on which the agent daemon process 34 is running or from which the non-root user CLI process is running.

The necessary security keys on a node 16 generally comprise the private key of the node 16 on which the agent daemon 34 or non-root user CLI process is running, and the public key of the CMS 14. The necessary security keys on a CMS 14 machine include those of the CMS node 16 (if the CMS 14 is being used as a node 16), the CMS 14 private key, and the public keys of all managed nodes 16 that are participating in the SCM cluster 17. As is described below, a node's 16 private key will be used to sign a message sent to the CMS 14, which will then use the node's 16 public key and an unsigned message to verify that message security was maintained.

The last task of the recovery of the security keys shown in the sequence diagram 50 is the issuance of the getKey (key_name) method by the daemon or cli object, as seen in FIG. 2. As is indicated by the second notation box 56, the getKey(key_name) method is executed using the real UID (e.g., the UID of the non-root user that entered the CLI). The key_name argument (within the parentheses) in the getKey method indicates the name of the key being requested by the daemon process or the non-root process. Consequently, the getKey(key_name) method will retrieve the private key of the node 16 on which the agent daemon 34 or non-root user CLI process is being run, if the node's 16 private key was cached.

If any of the preceding tasks were improperly executed or skipped (e.g, there was an error during the setKeys method), the node's 16 private key will not be cached. Likewise, if the node's 16 private key does not exist, the node 16 private key cannot be cached. If the node's 16 private key was not cached, the getKey method will fail. If the getKey method fails, the agent daemon 34 or non-root user CLI process will not be authorized to participate in the system 10.

Figure 4A:
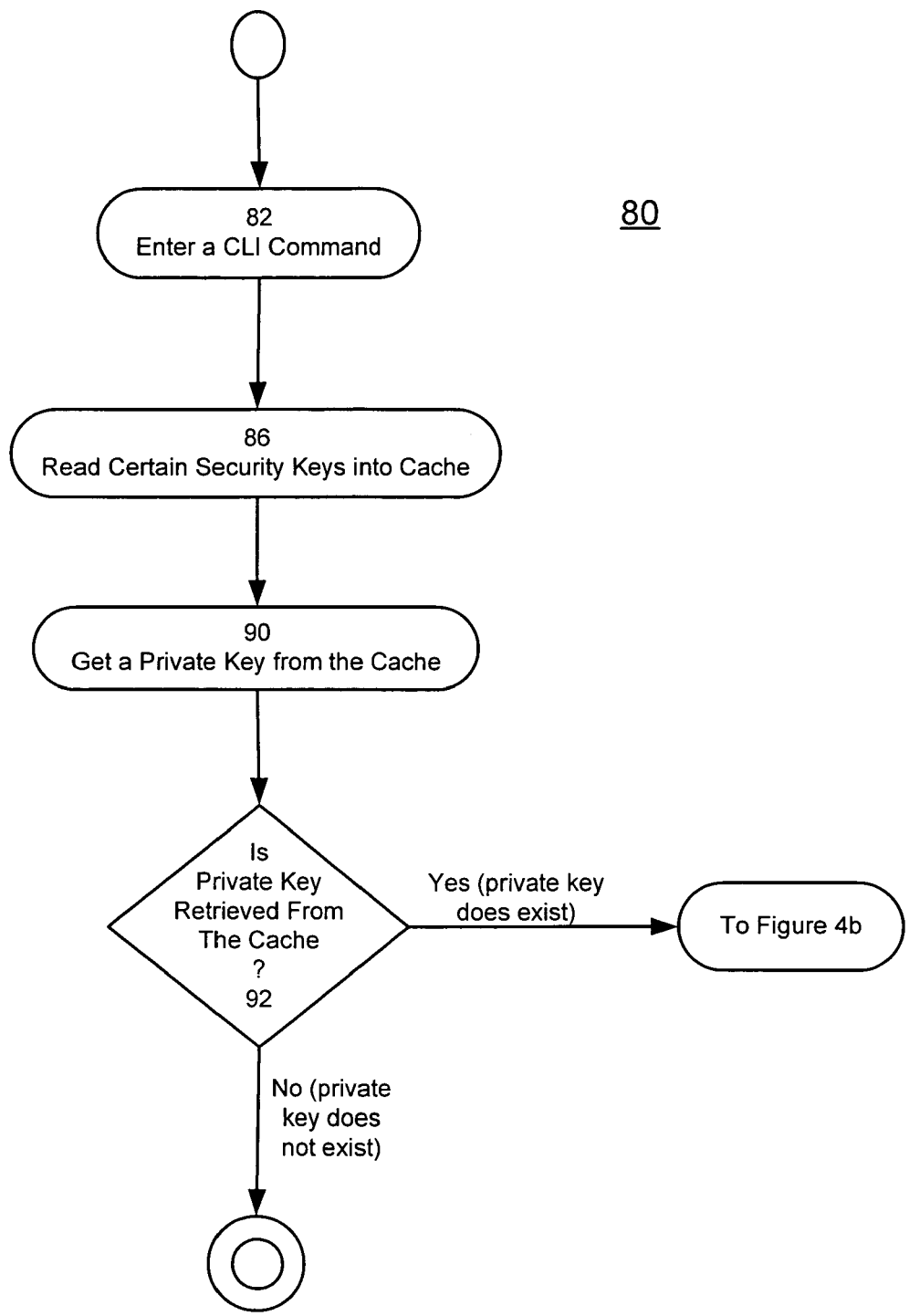
FIGS. 4a–4b are a flowchart illustrating a method of recovering security keys according to an embodiment of the present invention.
Figure 4B:
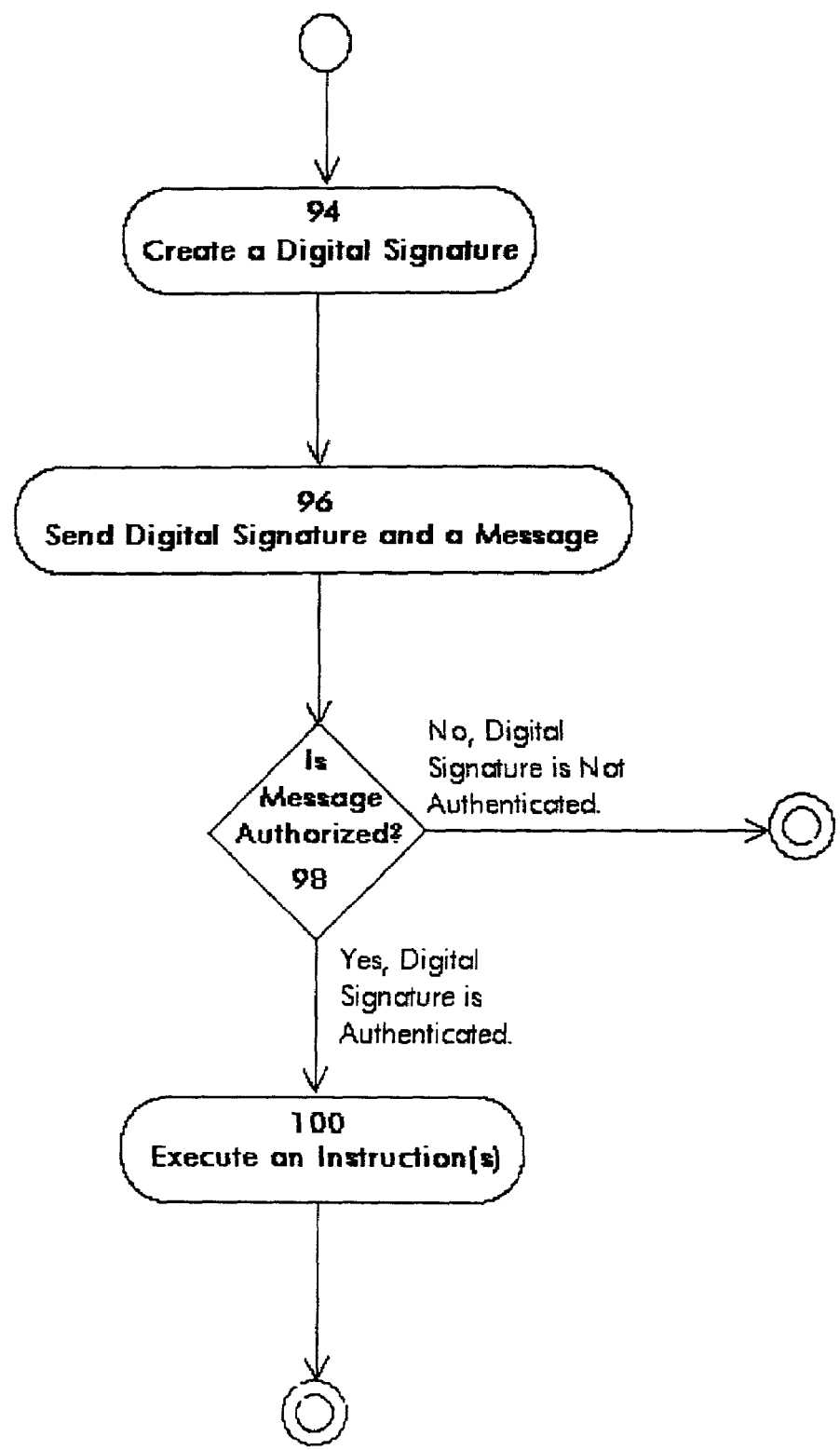

FIGS. 4a–4b illustrate a method 80 for recovering the security keys while maintaining security according to the process shown in the sequence diagram 50. As shown, the method 80 comprises entering a CLI or starting a daemon 82, reading certain security keys into a cache with root as effective UID 86, retrieving a private key from the cache using a real UID 90, determining if the private key is successfully retrieved 92, and, if the private key is retrieved from the cache, creating a digital signature 94, sending the digital signature and a message 96, determining if the message is authorized 98, and if the digital signature is authenticated, executing an instruction 100.

Referring to FIG. 4a, entering a CLI or starting a daemon 82 may comprise a non-root user entering a command at a node 16 or a daemon starting on the node 16. An authentication class (e.g., Authentication) may be instantiated to enable the authentication process. Reading certain security keys into cache with root as effective UID 86 may comprise the authentication class executing a read method that recovers certain security keys (i.e., the necessary security keys for a node 16 or the CMS 14, described above) into a cache. The method 80 may also comprise setting the certain keys (not shown). Setting the certain keys preferably comprises calling a method in the authentication class (e.g., a setKeys method) that comprises the read method and triggers performance of the read method when called. Again, performing these steps with root as the effective UID enables the recovery of the security keys; if the root was not the effective UID, the security keys could not be recovered.

Retrieving a private key from cache 90 preferably comprises retrieving from the cache the private key of the managed node 16 on which the CLI process or daemon is running. As such, the retrieving 90 preferably comprises the CLI or daemon calling the authentication class' getKey method for the private key and the authentication class returning the private key to the CLI or daemon. The method 80 may also comprise retrieving other security keys, such as the other necessary security keys described above (e.g., the CMS public key).

Determining if the private key is successfully retrieved 92 may comprise the CLI or daemon determining if the invoked authentication class getKey method returned the node 16 private key (e.g., the private key exists); if the node 16 private key was not returned (e.g., the private key does not exist), the authentication fails.

Referring to FIG. 4b, if the getKey method succeeds, the daemon or CLI will be permitted into the system 10 (i.e., the daemon or CLI will be able to send messages to the CMS 14, or receive messages from the CMS 14), but an authorization process will continue. Creating a digital signature 94 preferably comprises digitally signing a message with the private key. The message may be digitally signed with the private key according to known methods of digitally signing messages (e.g., Java's digital signing method). The message preferably includes instructions for execution by the CMS 14, Sending the digital signature and a message 96 may comprise a CLI sending the digitally signed message and an unsigned copy of the message to the CMS 14. Determining if the message is authorized 98 preferably comprises the CMS 14 verifying the digitally signed message with the cached node's public key. The CMS 14 may verify the signed copy of the message by signing the non-signed message with the node's 16 public key and doing a checksum of the public key signed message and the private key signed message. If the checksums are equal, than the digital signature is authenticated and the message authorization is successful.

If the digital signature is authenticated, the CMS 14 will authorize the CLI. Consequently, executing an instruction 100 may comprise the CMS 14 executing the instructions contained in the message. In many cases (e.g. when the CLI message comprises an exec command directing execution of a task by one or more managed nodes 16), this causes the same stepwise process (e.g., steps 94–98) to occur between the CMS 14 and an agent daemon 34 of a node 16. If the CMS 14 communicates a message (e.g., the exec command in the CLI message) to a node 16, the message is signed with the CMS 14 private key and the agent daemon 34 of the node 16 checks the message with the cached CMS 14 public key, as described above. Upon completion of a task (e.g., directed by the exec command in the CLI message and as communicated by the CMS 14 to the managed node 16), the agent daemon 34 will return a message back to the CMS 14, signing a copy of the return message with the cached node 16 private key. The CMS 14 will preferably check the return message with the cached node 16 public key, as described above.

Generally, once an agent daemon 34 is started and authorized, the agent daemon 34 will not have to repeat the complete process illustrated by the right side of the sequence diagram 50 unless the agent daemon terminates and is re-started. In other words, the agent daemon will not have to repeat steps 82–92 illustrated in FIGS. 4a–4b. The agent daemon 34 will continue to sign messages that are sent to the CMS 14, with its node's 16 cached private key, and the CMS 14 will continue to check the agent daemon 34 messages with the node's 16 cached public key, as described above.

Non-root user entered CLIs, however, preferably repeat the complete process illustrated by the right side of the sequence diagram 50 and the steps 82–98 of FIG. 4 each time they are entered.

While the invention has been described with reference to the exemplary embodiments thereof, those skilled in the art will be able to make various modifications to the described embodiments of the invention without departing from the true spirit and scope of the invention. For example, the methods described above may be executed in Java, using Java classes and objects running in a Java Virtual Machine.

The terms and descriptions used herein are set forth by way of illustration only and are not meant as limitations. Those skilled in the art will recognize that these and other variations are possible within the spirit and scope of the invention as defined in the following claims and their equivalents.

What is claimed is:

1. A method for persisting and recovering security keys in order to authorize a daemon or a command-line interface ("CLI"), comprising:

reading, with root as an effective user id, one or more security keys into a cache, wherein the root as effective user id enables the reading of root-only readable files including the one or more security keys and the one or more security keys can be accessed by a non-root user;

attempting to retrieve a private key from the cache using a real user id, wherein the cached certain security keys may include the private key and the private key may be used to digitally sign a message; and determining if the private key was retrieved from the cache, wherein a failure to retrieve the private key from the cache indicates that authorization failed.

2. The method of claim 1, further comprising:

setting, with the root as the effective user id, the certain security keys, wherein the setting the certain security keys triggers performance of the reading one or more security keys into a cache.

3. The method of claim 2, wherein the setting the certain security keys comprises calling a setKeys method, wherein the setKeys method includes the reading one or more security keys into a cache.

4. The method of claim 3, wherein a failure to retrieve the private key from the cache is caused by an error in the setKeys method.

5. The method of claim 1, further comprising:

entering the CLI, wherein the CLI is entered by a non-root user on a managed node and the private key is a security key of the managed node.

6. A method for persisting and recovering security keys in order to authorize a daemon or a command-line interface ("CLI"), comprising:

reading, with root as an effective user id, one or more security keys into a cache, wherein the root enables the reading of files including the one or more security keys;

attempting to retrieve a private key from the cache using a real user id, wherein the cached certain security keys may include the private key and the private key may be used to digitally sign a message;

determining if the private key was retrieved from the cache, wherein a failure to retrieve the private key from the cache indicates that authorization failed;

entering the CLI, wherein the CLI is entered by a non-root user on a managed node and the private key is a security key of the managed node, wherein the managed node has a public key;

if the private key was retrieved from the cache, sending a message and a message copy, wherein the message copy is digitally signed with the private key from the managed node;

digitally signing the message with the managed node's public key;

comparing the message signed with the public key to the message copy signed with the private key; and determining if the message is authorized based on the comparison of the message signed with the public key to the message copy signed with the private key.

7. The method of claim 6, wherein the message comprises an executable, the method further comprising:
   if the message is authorized, executing the executable.

8. The method of claim 1, further comprising:
   running a daemon process, wherein the daemon is run on a managed node and the private key is a security key of the managed node.

9. A method for persisting and recovering security keys in order to authorize a daemon or a command-line interface ("CLI"), comprising:
   reading, with root as an effective user id, one or more security keys into a cache, wherein the root enables the reading of files including the one or more security keys;
   attempting to retrieve a private key from the cache using a real user id, wherein the cached certain security keys may include the private key and the private key may be used to digitally sign a message;
   determining if the private key was retrieved from the cache, wherein a failure to retrieve the private key from the cache indicates that authorization failed;
   running a daemon process, wherein the daemon is run on a managed node and the private key is a security key of the managed node, wherein the managed node has a public key;
   if the private key was retrieved from the cache, sending a message and a message copy, wherein the message copy is digitally signed with the private key from the managed node;
   digitally signing the message with the managed node's public key;
   comparing the message signed with the public key to the message copy signed with the private key; and
   determining if the message is authorized based on the comparison of the message signed with the public key to the message copy signed with the private key.

10. The method of claim 1, wherein the reading one or more security keys into a cache is performed by an authentication class.

11. The method of claim 10, wherein the cache is a private variable in the authentication class.

12. The method of claim 1, further comprising:
    generating a security key pair, wherein the security key pair comprises the private key and a corresponding public key;
    serializing the security key pair as a key file; and
    storing the key file, wherein the reading one or more security keys into a cache comprises de-serializing the key file and reading the private key into the cache.

13. A tangible computer readable medium containing instructions for controlling a computer system to persist and recover security keys in order to authorize a daemon or a CLI, by:
    reading, with root as an effective user id, one or more security keys into a cache, wherein the root as effective user id enables the reading of root-only readable files including the security keys and the one or more security keys can be accessed by a non-root user;
    attempting to retrieve a private key from the cache using a real user id, wherein the cached one or more security keys may include the private key and the private key may be used to digitally sign a message; and
    determining if the private key was retrieved from the cache, wherein a failure to retrieve the private key from the cache indicates that authorization failed.

14. The tangible computer readable medium of claim 13, further containing instructions for controlling the computer system by:
    setting, with the root as an effective user id, the security keys, wherein the setting the security keys triggers the reading one or more security keys into a cache.

15. The tangible computer readable medium of claim 14, wherein the setting the security keys comprises calling a setKeys method, wherein the setKeys method includes the reading one or more security keys into a cache.

16. A tangible computer readable medium containing instructions for controlling a computer system to persist and recover security keys in order to authorize a daemon or a CLI, by:
    reading, with root as an effective user id, one or more security keys into a cache, wherein the root enables the reading of files including the security keys;
    attempting to retrieve a private key from the cache using a real user id, wherein the cached one or more security keys may include the private key and the private key may be used to digitally sign a message;
    determining if the private key was retrieved from the cache, wherein a failure to retrieve the private key from the cache indicates that authorization failed, wherein the computer system comprises a managed node and the managed node has a public key;
    if the private key was retrieved from the cache, sending a message and a message copy, wherein the message copy is digitally signed with the private key from the managed node;
    digitally signing the message with the managed node's public key;
    comparing the message signed with the public key to the message copy signed with the private key; and
    determining if the message is authorized based on the comparison of the message signed with the public key to the message copy signed with the private key.

17. A method for persisting and recovering security keys in order to authorize a daemon or a CLI, comprising:
    initializing an authentication class, wherein the authentication class comprises a setKeys method that includes a reading step;
    calling, with root as an effective user id, the setKeys method of the authentication class, wherein the root as effective user id enables the reading of root-only readable files including security keys and the security keys can be accessed by a non-root user;
    reading necessary security keys into a cache with the root; and
    retrieving the necessary security keys from the cache using a real user id.

18. The method of claim 17, wherein the cache is a private variable of the authentication class.

19. The method of claim 17, wherein the necessary security keys are a private key of a managed node on which the authentication class is running and a public key of a central management server to which the managed node is operatively connected.

20. The method of claim 17, wherein the authentication class is a Java class running in a Java Virtual Machine, the method further comprising:
    initializing the Java Virtual Machine.

21. The method of claim 20 wherein the reading necessary security keys into the cache with the root enables the retrieving the necessary security keys from the cache using the real user id so long as the Java Virtual Machine is running.

22. The method of claim 1 wherein the reading one or more security keys into the cache with root as the effective id is performed at startup of a Java Virtual Machine and enables the retrieval of the one or more security keys from the cache using a real user id so long as the Java Virtual Machine is running.

23. The tangible computer readable medium of claim 13 wherein the reading one or more security keys into the cache with root as the effective id is performed at startup of a Java Virtual Machine and enables the retrieval of the one or more security keys from the cache using a real user id so long as the Java Virtual Machine is running.

* * * * *